June 2, 1931.  D. W. THOMAS  1,808,440
STEERING WHEEL
Filed May 13, 1929  3 Sheets-Sheet 1

INVENTOR
David W. Thomas
BY
Evans & McCoy
ATTORNEYS

June 2, 1931.  D. W. THOMAS  1,808,440
STEERING WHEEL
Filed May 13, 1929   3 Sheets-Sheet 2
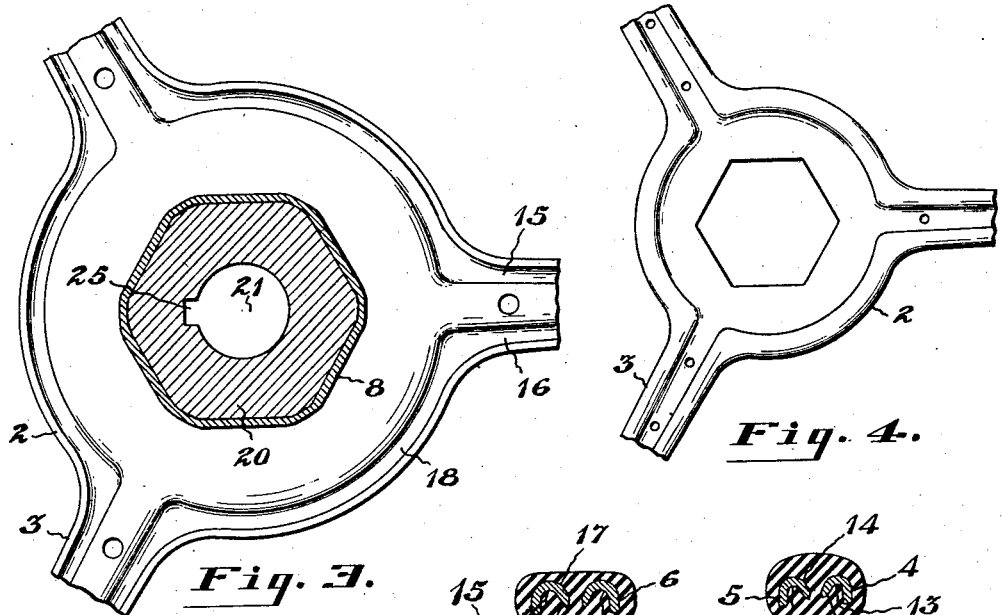
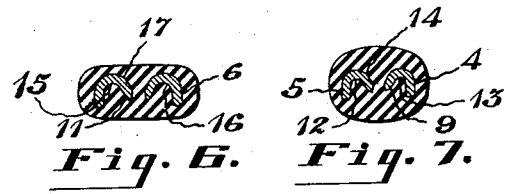
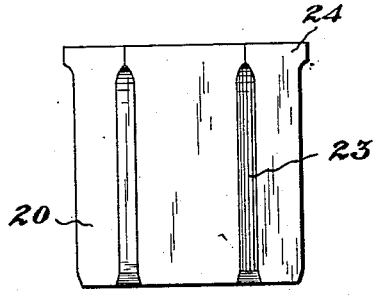
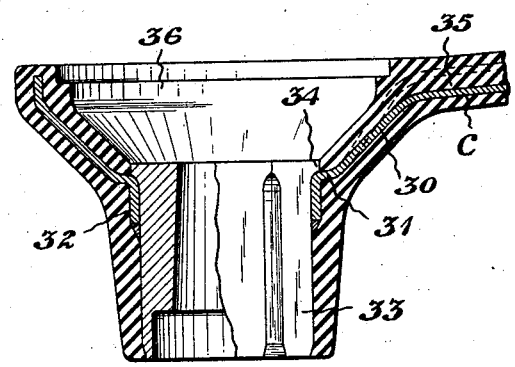
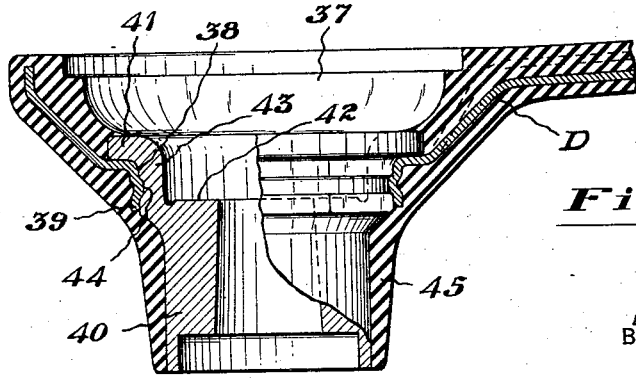
INVENTOR
David W. Thomas
BY
Evans + McCoy
ATTORNEYS June 2, 1931.     D. W. THOMAS     1,808,440
STEERING WHEEL
Filed May 13, 1929     3 Sheets-Sheet 3

INVENTOR
David W. Thomas
BY
Evans + McCoy
ATTORNEYS

Patented June 2, 1931

1,808,440

UNITED STATES PATENT OFFICE

DAVID W. THOMAS, OF YOUNGSTOWN, OHIO, ASSIGNOR TO THE NILES STEEL PRODUCTS COMPANY, OF NILES, OHIO, A CORPORATION OF OHIO

STEERING WHEEL

Application filed May 13, 1929. Serial No. 362,675.

This invention relates to steering wheels and particularly to steering wheels embodying a metal reinforcing member embedded in a body of composition material.

One of the objects of the present invention is to provide a reinforcing spider for a steering wheel which is of relatively light weight and which possesses great strength and rigidity.

Another object is to provide a reinforced composition steering wheel with a solid metal hub member which is securely embedded in the composition body and rigidly secured to the steering wheel reinforcement.

Another object is to provide a reinforced composition steering wheel with an improved and simple hub construction which can be very economically manufactured and may be easily assembled to the reinforcing spider thereof without the use of bolts, rivets, and the like.

A further object is to provide a reinforced composition steering wheel with a single piece reinforcing spider having a flanged hub annulus and a separately formed hub member forced into the hub annulus by means of a press fit, the hub member having a head portion adapted to engage the web of the hub annulus to insure axial alignment of the hub member with the reinforcing spider.

A still further object is to provide a reinforced composition steering wheel with a single piece reinforcing spider having a hub annulus provided with a depending non-circular flange, and a non-circular separately formed hub member pressed into the hub annulus with the walls thereof in engagement with the walls of the non-circular flange to prevent relative rotation, the hub member being provided with portions adapted to engage the web of the hub annulus to insure axial alignment of the separately formed hub with the reinforcing spider.

With the above and other objects in view, the present invention may be said to comprise the steering wheel as illustrated in the accompanying drawings hereto fore described and particularly set forth in the appended claims, together with such variations and modifications thereof, as will be apparent to one skilled in the art to which the invention appertains.

In the accompanying drawings which illustrate a suitable embodiment of the present invention, Figure 1 is a plan view of a reinforced composition steering wheel, a portion of the composition material being broken away to clearly show the reinforcing spider.

Fig. 3 is a section of the hub of the steering wheel taken substantially on the line 3—3 of Fig. 2, the composition material being broken away from the reinforcing spider.

Fig. 4 is a plan view of the hub annulus of the spider which shows the appearance of the same before the separately formed hub member is pressed into the central opening thereof.

Fig. 5 is an enlarged side elevation of the separately formed hub showing the corners of the side faces rounded off to provide overlying portions.

Fig. 6 is a transverse section of one of the spokes of the wheel taken substantially on line 6—6 of Fig. 1.

Fig. 7 is a transverse section taken through the rim of the steering wheel taken substantially on the line 7—7 of Fig. 1.

Fig. 8 is a fragmentary sectional view of a modified type of a steering wheel having a somewhat larger central opening than the wheel shown in the preceding figures.

Fig. 9 is a fragmentary sectional view of still another modified type of steering wheel showing the metal of the hub annulus flange spun into a groove formed around the separately formed hub member.

Figure 1:
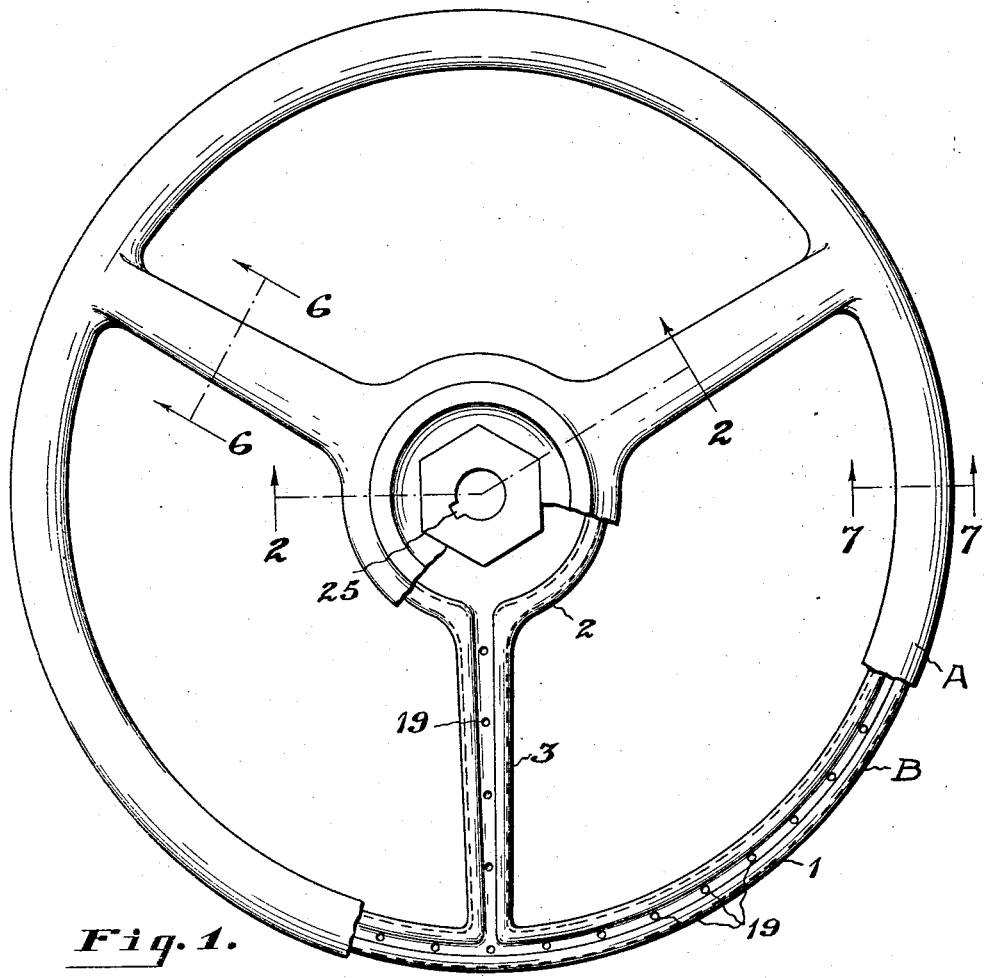

The steering wheel of the present invention has a body A composed of a suitable composition material, such as hard rubber or other initially plastic moldable composition, the composition material being molded around a pressed metal reinforcing spider B, which is preferably formed from a single piece of sheet metal having a continuous rim 1, a continuous hub annulus 2, and radial spokes 3 joining the rim 1 and hub annulus 2 and integrally connected with both.

In order to provide a spider which is very rigid and which in itself possesses considerable strength, the rim, hub and spokes are reinforced throughout the suitable ribs and flanges which will now be described.

The rim 1 is provided with an outer continuous flange 4 along the outer edge thereof, and with flanges 5 between the spokes along the inner edge thereof. The spokes 3 are also provided with side flanges 6 which are continuous with the inner flanges 5 of the rim 1 and also with flanges 7 along the outer edge of the hub annulus 2 between the spokes 3, the flanges 5, 6, and 7 thus form a continuous flange around each opening between the spokes 3 of the reinforcing spider B. The hub annulus 2 is formed with a central opening 10 and with a continuous downwardly extending flange 8 at its inner edge defining the central opening 10, which flange 8 extends in the same direction as the flange 7 along the outer edge of the hub annulus. As shown in Fig. 4, the central opening 10 is of polygonal shape, which provides the flange 8 with a plurality of walls for a purpose which will be later described. The side flanges of the rim, spokes and hub annulus reinforce the spider A throughout, but in order to obtain greater rigidity, the rim 1 is formed with a continuous reinforcing rib 9 in the form of a corrugation pressed in the web of the channel between the flanges 4 and 5, the hub annulus 2 being provided with a circumferential reinforcing rib 11a in the form of a corrugation in the web of the same adjacent to the edge of the flange 7. The spokes 3 are each provided with a longitudinal rib 11 in the form of a corrugation in the web thereof, between the side flanges 6 projecting in the same direction as the side flanges 6, the ribs 11 of the spokes extending from the rib 11a of the hub annulus to the rib 9 of the rim.

The side flanges 4 and 5 and the intermediate rib 9 of the rim form inner and outer downwardly facing channels 12 and 13, and a continuous upwardly facing channel 14. The longitudinal ribs 11 in the spokes provide downwardly facing channels 15 and 16 between the side flanges 6, and an upwardly facing channel 17. The side flange 7 and the circumferential rib 11a of the hub annulus provide a downwardly facing channel 18. The channels 15, 16 and 17 of the spokes 3 are continuous with the channels 12 and 14 of the rim 1, and the channels 15 and 16 are continuous with the circumferential channel 18 of the hub annulus 2. The upwardly presenting channel 17 of the spokes extends through the rib 11a of the hub annulus so that the bottoms of the same are substantially flush with the upper surface of the web of the hub annulus 2 which is bounded by the rib 11a.

The extremely rigid hub construction of the steering wheel which is about to be described, and the channeled and flanged reinforcing spider just described, makes it practical to construct a steering wheel having only three spokes, the great rigidity of the hub and spider structure giving the finished wheel the necessary strength and rigidity. The three-spoke steering wheel is advantageous not only because of its lightness and because of the saving of material in its construction, but also for the reason that the wide spaces between the spokes give the driver of a vehicle having this wheel thereon a better view of the instrument panel, the same not being obstructed by one of the spokes.

The spaced perforations 19 are provided in each of the spokes 3 at the bottoms of the channels 17 and in the rim 1 at the bottom of the channel 14 so that when composition material is molded around the spider to form the composition body A, it will flow through the perforations 19 to integrally unite the composition body A throughout the wheel, through the reinforcing spider B.

The important feature of the present invention is the provision of a novel and improved hub construction for the reinforcing spider. A steering wheel embodying the hub construction of the present invention, which is about to be described, is considerably strengthened and can be very economically manufactured because of the simplicity of the hub, easy assembly of the hub to the spider, and the ultimate elimination of hub securing bolts, rivets, screws, and the like.

Figure 2:
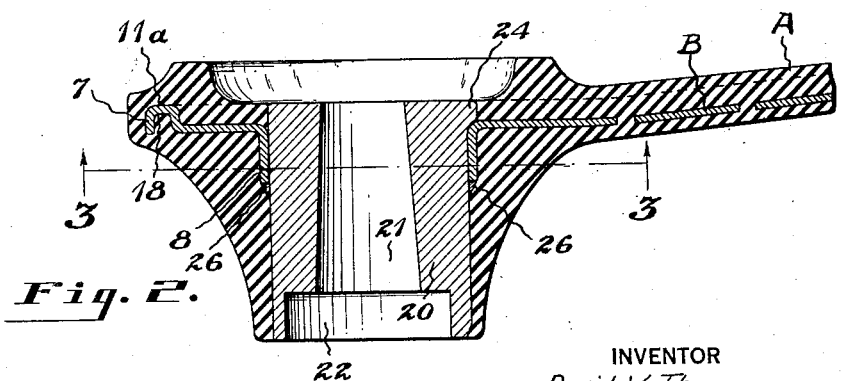
Fig. 2 is an enlarged section of the steering wheel taken substantially on the line 2—2 of Fig. 1, showing the separately formed hub member telescoped with the hub annulus, and showing composition material molded around the reinforcing spider and separately formed hub.

The hub member 20 illustrated in Figs. 2, 3 and 5, is preferably formed of hexagonal shaped or other non-circular steel stock. The hub because of its simplicity is particularly adapted to be machined in an automatic screw machine which simultaneously performs all the machining operations at a single setting and with great rapidity. The hub 20 is formed with a tapered central opening 21 which is counterbored, if desired, at 22 at its lower end, the central opening 21 providing means to attach the steering wheel to a steering post (not shown). The counterbore 22 is adapted to telescope with and seat on the tubular member (not shown) which surrounds the steering post in conventional steering column constructions. The intersecting side faces of the hub 20 are slightly rounded off as shown in Figs. 3 and 5 to provide rounded surfaces 23. The rounded surfaces 23, however, do not extend the entire length of the hub 20, but terminate just below the end opposite the counterbore 22 so that the hub is provided with overlying projections 24, which may be termed as a head for the hub 20. As shown in Fig. 5, these projections extend beyond and overlie the rounded surfaces 23 for a purpose which will be apparent in the following description of the method of assembling the hub 20 to the reinforcing spider B. It is to be noted in Fig. 5 that the flat faces of the hub extend throughout the entire length of the hub.

The central opening 10 defined by the inner flange 8 of the spider hub annulus 2 is also of hexagonal shape as previously described, but is of slightly smaller size than the body portion of the separately formed hub 20. The spider B is supported in a suitable die and the hub member 20 is driven into the central opening 10, the sharp edges of the intersecting walls of the hub flange 8 being distorted to assume the shape of the body portion of the hub 20. The hub 20 is in this manner rigidly and securely carried by the spider hub annulus 2 by a so-called press fit. When the hub 20 is completely pressed into the spider, the overlying projections 24 engage the upper face of the web of the hub annulus 2 to insure positive axial alignment of the hub 20 with the spider A. Provision of these overlying projections 24 on the hub 20 eliminates the necessity of reaming out the central bore 21 to axially align the same with the spider after the spider and hub are assembled, because the same is compensated for by the projections 24. After the hub and spider are assembled in this manner a keyway 25 is then cut into the same to provide means for preventing rotation of the steering wheel relative to the steering post when it is secured to the same. It is preferable, although not entirely necessary, that the end of the flange 8 of the hub annulus 2 be welded to the hub 20 at a number of places as indicated by the weld metal 26 in Fig. 2.

The spider B built up in this manner is then supported in a suitable mold and suitable composition material is molded around the rim, spokes and hub of the same to completely embed the spider, with the exception of the lower annular face of the hub 20 and the upper surface thereof. The lower annular face is preferably left exposed to provide an abutent surface for engagement with a wheel pulling device, which is often used to remove the steering wheel from the steering post on which it is assembled. The upper end face of the hub 20 is left exposed so that the nut (not shown) which secures the wheel to the steering post will have a rigid abutment surface. During the process of molding the composition body A around the spider, the composition material flows through the openings 19 in the rim 1 and the spokes 3 so that it is integrally united through the same. The greater portion of the gases which are formed during the molding of the composition material around the spider segregate in the several channels formed in the rim and spokes, and flow from the rim channels into the spoke channels, and finally escape at the central hub opening so that they will not destroy the homogenity of the composition body A by blowing through the same, which would be the case if no provision was made for their escape.

It will be apparent that the present invention provides a reinforced composition steering wheel which possesses great strength and rigidity, and that the invention may be embodied in a steering wheel having only three spokes which will have ample strength by reason of its lightness and low cost of manufacturing, and also by the less obstructed view of the instrument panel.

It is further evident that the low cost of manufacturing is obtained by the fact that the simple hub member can be easily made in an automatic screw machine, that the operation of assembling the spider is simple and can be performed with great speed, and that bolts, screws, etc. and the assembling operations incident thereto are eliminated.

It is evident that the present invention provides a wheel of superior quality by reason of its strength, lightness and simple hub construction, which is very adaptable for motor vehicles coming within the low price class.

In many motor vehicles of the medium price class, the gas, spark, and light control levers are positioned on the steering wheel and are operated by tubes connected therewith which extend through the steering post. These controls are generally arranged in such a manner that they do not extend to any great extent above the steering wheel, the hub portion of the wheel being depressed or recessed to receive the body portions of the levers. Fig. 8 illustrates a modified form of the present invention which will satisfactorily provide a housing for control levers such as those just described. The reinforcing spider C shown in Fig. 8 is formed with a hub annulus 3, the metal at the inner edge thereof being inclined downwardly to provide a large central depression, then bent inwardly to form a horizontal web 31, the marginal edges of which are flanged perpendicular thereto parallel with the axis of the spider C to provide a non-circular hub receiving socket 32. A hub member 33 which has been previously formed from polygonal shaped stock in a screw machine similar to the hub member 20 shown in Fig. 4 is then forced into the spider C with a press fit, so that the plurality of walls thereof engage the walls of the hub receiving flange 32, and so that the head portion 34 engages the web 31 when it is in completely assembled position to insure axial alignment of the hub 33 with the reinforcing spider C. Composition material 35 is molded around the spider and the hub substantially as shown in Fig. 8. It can be seen in this view that a steering wheel is provided which has a large central depression 36 therein to house the several control members which are commonly used in motor vehicles at the present time.

Fig. 9 illustrates a further modification wherein a wheel is provided with an extremely large central hub portion. Wheels of this nature are used to considerable extent on motor vehicles, coming within the high price class. The spider D shown in Fig. 9 is formed similar to the spider C shown in Fig. 8, but with a somewhat larger central depression 37 and opening 38 defined by the depending hub annulus flange 39. The hub member 40 which is used in this wheel is preferably formed from a casting having a horizontally flanged head portion 41 positioned above the upper face 42 thereof and connected to the body thereof by the annular flange 43. The annular flange 43 connecting the flange 41 with the body portion of the hub member 40 is formed with a circumferential recess 44. The hub member 40 is polygonal shaped adjacent the flange 41 and is assembled to the spider D by forcing the same into the central opening 38 of the spider with a press fit so that the walls thereof engage the flange 39 of the spider defining the central flange 39 opening 38, and the metal of the flange 39 is spun into the circumferential recess 44 to provide a simple securing means so that the hub member 40 cannot possibly be withdrawn from the reinforcing spider D. Composition material 45 is also molded around the hub member 40 and the reinforcing spider D substantially as shown. This construction provides a very rigid wheel structure having an exceptionally large central housing therein for receiving control levers and the like.

Figure 10:
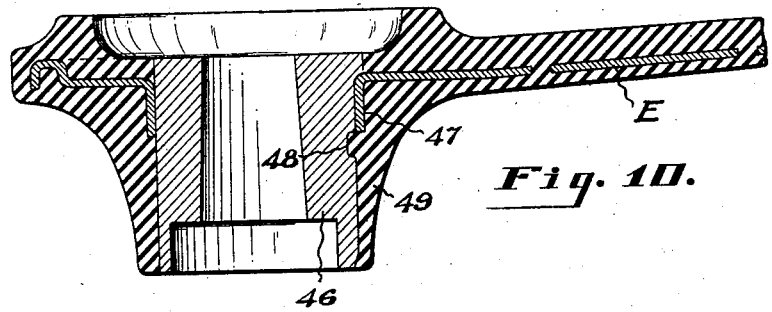
Fig. 10 is a fragmentary sectional view of a modified type of hub construction showing a groove therein into which composition material is molded.

Fig. 10 illustrates a modified form of hub structure which is identical to that shown in Fig. 2 with the exception that the hub 46 and depending flange 47 of the spider E are not welded together as previously described, but the hub 46 is formed with a circumferential groove 48 adjacent the edge of the depending flange 47. The composition material 49 in which the spider E is embedded is molded into the circumferential groove 48 as shown in Fig. 10 to securely hold the hub 46 in place in the spider E.

Figure 11:
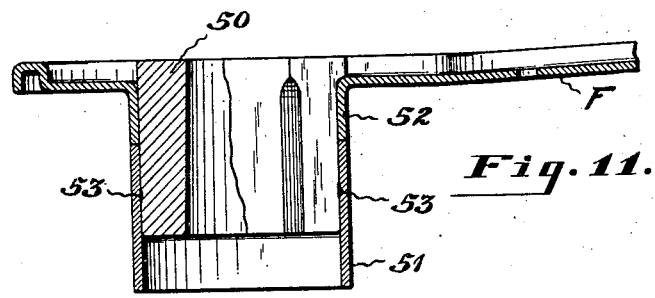
Fig. 11 is a fragmentary sectional view of an alternative form of hub construction showing a tubular member telescoped with and welded to the body of the separately formed hub member, one end of which is in engagement with the flange of the hub annulus.

Figure 11 illustrates an alternative construction for the counterbore shown and described in connection with Fig. 2. In this construction the spider F and hub 50 are identically the same as shown in Fig. 2 with the exception that the hub 50 is shorter and is not provided with a counterbore. A tubular member 51 is telescoped with the hub 50 with a drive fit and abuts against the edge of the depending flange 52 of the spider F. The tubular member 51 is preferably spot welded to the hub 50 at points designated by the numeral 53. The tubular member 51 extends beyond the end of the hub 50 and consequently replaces the counterbore 22 previously described in connection with Fig. 2 so that a considerable saving in material is effected.

Figure 12:
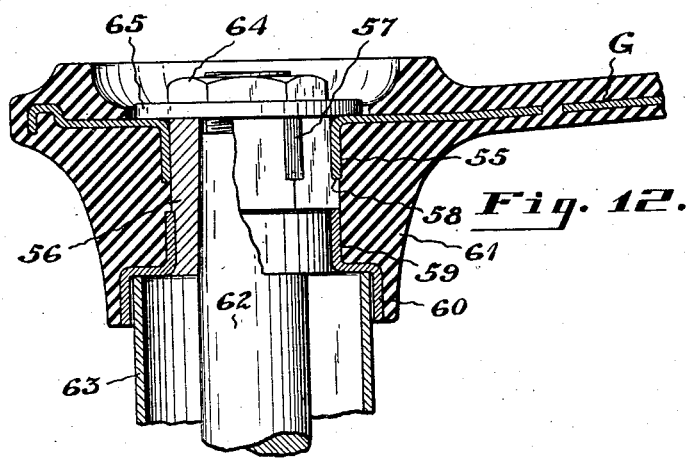
Fig. 12 is a fragmentary sectional view of a modified type of hub construction embodying the present invention showing the separately formed hub inverted as compared with the preceding figures.

Fig. 12 illustrates a modified construction which is slightly different than the constructions shown in the preceding figures. In this construction the spider G is identical to the spider B shown in Fig. 2 and is provided with a polygonal shaped inner depending flange 55. The hub 56 is of polygonal shape and is formed with rounded corners 57 extending from one end which merge into the intersecting faces of the sides of the hub intermediate the ends thereof so that the hub is provided with projections 58 extending beyond the rounded faces 57. The hub 56 is telescoped with a drive or press fit with the flange 55, but in the opposite direction to that previously described, so that the projections 58 engage the end edges of the flange 55 to insure axial alignment of the hub and spider. The end of the hub 56 projecting beyond the end edge of the flange 55 is turned down to a circular shape and a tubular member 59 is telescoped therewith and welded thereto. As shown in Fig. 12, the open end of the tubular member 59 is swaged to provide a portion of increased diameter to form a counterbored effect as indicated at 60. Composition material 61 is molded around the spider and hub, so assembled, a portion of the upper face hub annulus being exposed. When the wheel is assembled to a steering post 62 the swaged end 60 of the tubular member 56 telescopes with the steering tube 63 which surrounds the post 62 and the threaded end of the post 62 extends above the end face of the hub 56. A nut 64 is threaded on the post 62 and is provided with a flanged portion 65 which engages the web of the spider hub annulus to securely hold the wheel on the steering post and to prevent the hub 56 from working loose in the depending flange of the spider G.

The several modifications and alternative features have been shown and described to clearly illustrate the many possible commercial structures in which the present invention can be readily adapted.

It is clearly evident that the present invention provides an improved hub structure for steering wheels of the class described which is of commercial importance, particularly because of its simplicity and strength and because it can be manufactured very economically.

Aside from the specific embodiments of the invention herein shown and described, it will be understood that numerous details of construction may be altered and omitted without departing from the spirit and scope of this invention, and it is not intended to limit the invention to the exact construction set forth, as it is desired to claim the invention broadly as well as specifically, as indicated in the appended claims.

What I claim is:

1. In a steering wheel, a spider comprising integrally united rim, spokes and hub annulus, a depending polygonal flange integral with said hub annulus and defining the central opening thereof, and a separately formed polygonal hub member tightly telescoped with said flange, the intersecting faces of said hub member being rounded for a portion of their length to form overlying portions, said overlying portions having engagement with said hub annulus to insure axial alignment of said hub member with said spider.

2. A hub member for a steering wheel spider, comprising a rigid hollow polygonal body, the intersecting exterior faces of which are rounded for a portion of their length to provide portions overlying said rounded faces.

3. In a steering wheel, a spider comprising integrally united rim, spokes and hub annulus, a depending polygonal flange integral with said hub annulus and defining the central opening thereof, a separately formed polygonal hub member tightly telescoped with said flange, the intersecting faces of said hub member being rounded for a portion of their length to form overlying portions, said overlying portions having engagement with said hub annulus to insure axial alignment of said hub member with said spider, and a composition body in intimate contact with and completely embedding said spider.

4. In a steering wheel, a metal rim, flanged sheet metal spokes radiating inwardly therefrom, a sheet metal hub annulus having a depending polygonal inner flange, and outer flanges continuous with the flanges of said spokes, a separately formed polygonal hub member tightly telescoped with said inner flange, the intersecting faces of said hub member being rounded for a portion of their length to form overlying portions, said overlying portions having engagement with said hub annulus to insure axial alignment of said hub member with said spider, and a composition body molded completely around said rim, spokes and hub annulus, and around the exterior longitudinal surface of said hub member.

5. In a steering wheel, a spider comprising a sheet metal hub annulus having a polygonal flange depending therefrom, a polygonal hub member telescoped with said flange, the intersections of the faces of said hub member being rounded for a portion of their length, and a tubular sleeve member telescoped with said hub member to abut against said flange and extend beyond the end of said hub member.

In testimony whereof I affix my signature.

DAVID W. THOMAS.